United States Patent
Rohs et al.

[11] Patent Number: 5,863,253
[45] Date of Patent: Jan. 26, 1999

[54] TORSIONAL VIBRATION DAMPING ASSEMBLY

[75] Inventors: Ulrich Rohs, Düren; Dietmar Heidingsfeld, Aachen, both of Germany

[73] Assignee: Patentverwertungsgesellschaft Rohs Voigt mbH, Düren, Germany

[21] Appl. No.: 755,175

[22] Filed: Nov. 25, 1996

[30] Foreign Application Priority Data

Dec. 1, 1995 [DE] Germany ................. 195 44 832.4

[51] Int. Cl.⁶ ............................................... F16D 3/68
[52] U.S. Cl. .......................... 464/66; 464/160; 192/212
[58] Field of Search ......................... 192/205, 207, 192/212, 30 V, 38, 44, 72; 464/66, 160, 51, 30

[56] References Cited

U.S. PATENT DOCUMENTS

| | | | |
|---|---|---|---|
| 2,909,911 | 10/1959 | Spaetgens | 464/66 |
| 3,106,828 | 10/1963 | Burrows . | |
| 4,396,103 | 8/1983 | Loizeau . | |
| 4,884,996 | 12/1989 | Schmitt et al. | 464/66 X |
| 5,180,044 | 1/1993 | Fukushima et al. | 464/66 X |

FOREIGN PATENT DOCUMENTS

| | | |
|---|---|---|
| 0 082 595 | 6/1983 | European Pat. Off. . |
| 0 474 035 | 3/1992 | European Pat. Off. . |
| 1 239 144 | 4/1967 | Germany . |
| 27 51 151 | 10/1979 | Germany . |
| 32 27 809 | 1/1984 | Germany . |
| 36 43 520 | 7/1991 | Germany . |
| 59-200815 | 11/1984 | Japan . |

*Primary Examiner*—Richard M. Lorence
*Attorney, Agent, or Firm*—Collard & Roe, p.c.

[57] ABSTRACT

A torsional vibration damping assembly, comprising a rotating driving disk and a driven disk having a jacket surface with a polygonal cross-section. The driven disk is arranged coaxially with the driving disk and rotates in the same direction as the driving disk. The driving disk has an overlapping ring-shaped portion that partly grips over the driven disk. A plurality of radial pockets having wedge-shaped ends are disposed around the circumference of the inside face of the ring-shaped portion of the rotating driving disk. A pair of wedge-shaped thrust pistons are arranged in each of the radial pockets. The pistons are slightly curved or planar on their sides facing the jacket surface of the driven disk. There is at least one pressure spring arranged in each pocket that keeps the pistons apart from one another. There is also a plurality of devices such as pressure springs for effecting a reset moment from the driving disk to the driven disk during idle run, that exerts almost no frictional force.

7 Claims, 4 Drawing Sheets

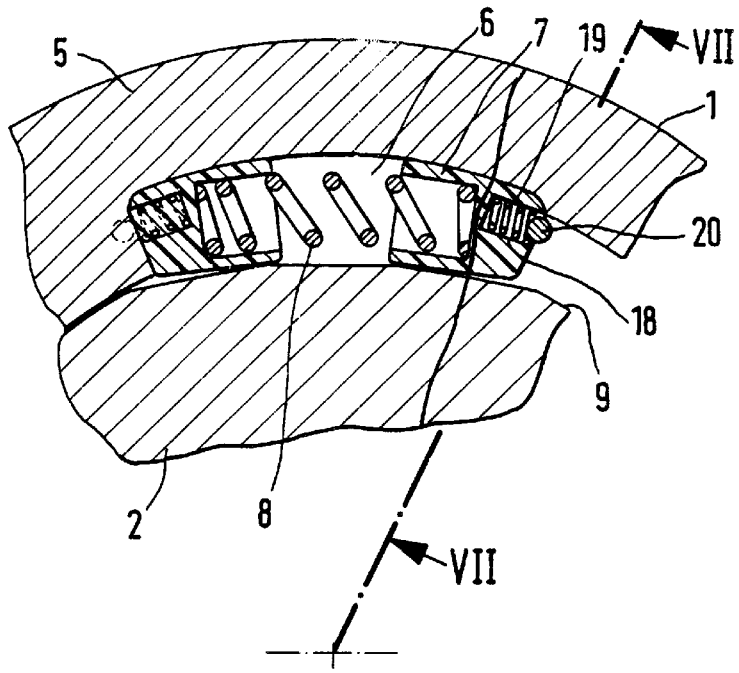
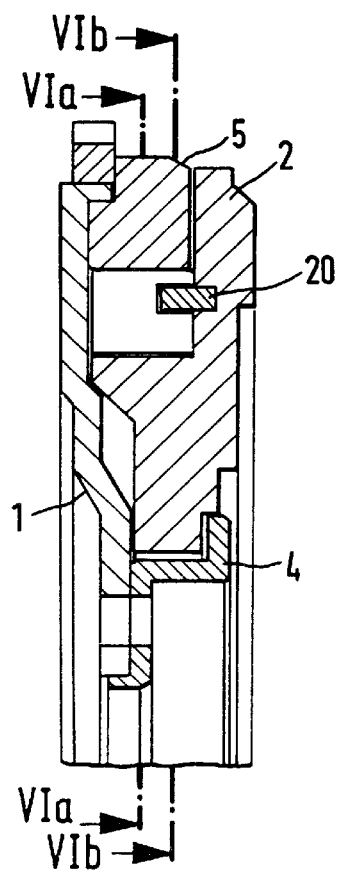

TORSIONAL VIBRATION DAMPING ASSEMBLY

BACKGROUND OF THE INVENTION

1. Field of the Invention

The invention relates to a clutch with means for elastic force transmission, comprising a rotating driving disk and a driven disk. The driven disk is coaxial with the rotating driving disk and rotates in the same direction.

2. The Prior Art

In engines with clutches, it is disadvantageous if the torsional vibrations of the engine are transmitted to the drive train, particularly when the vibrational frequencies are close to the inherent frequencies of the system. This sensation is unpleasant, especially during idling, In order to avoid this, various constructions are known, in which elastic damping means such as springs or hydraulic components are arranged between the coupling parts. However, such designs work in only part of the operational spectrum of the drive, and are ineffective over the entire other part of the load range. These designs are also ineffective in the idle run range. This is because the load range requires high spring force and high attenuation conforming to the transmitted torque and the number of revolutions, whereas during idle run, even low spring forces and practically no damping suffice to achieve decoupling. In addition, the known designs are very complicated and expensive to build.

SUMMARY OF THE INVENTION

It is therefore an object of the present invention to overcome the drawbacks of the prior art and to create a clutch which permits vibration decoupling in all load ranges of a drive, including the idle range, and which is simple to manufacture and reasonably priced. This is particularly important for vehicle drives.

The present invention comprises a torsional vibration damping assembly having means for elastic force transmission, comprising a rotating driving disk and a driven disk having a jacket surface with a polygonal cross-section. The driven disk is arranged coaxially with the driving disk and rotates in the same direction as the driving disk. The driving disk has an overlapping ring-shaped portion that partly grips over the driven disk. A plurality of radial pockets having wedge-shaped ends are disposed around the circumference of the inside face of the ring-shaped portion of the rotating driving disk. A pair of wedge-shaped thrust pistons are arranged in each of the radial pockets. The pistons are slightly curved or planar on their sides facing the jacket surface of the driven disk. There is at least one pressure spring arranged in each pocket that keeps the pistons apart from one another. There is also a means for effecting a reset moment from the driving disk to the driven disk during idle run, that exerts almost no frictional force.

In the present invention, the thrust pistons serve both as elastic force-transmitting means and as means for damping the torsional vibrations. Depending on the direction of rotation of the driving disk, one or the other thrust piston is displaced against the center of the pocket and against the action of the pressure springs connecting the thrust pistons. This piston takes along the driven disk, and also exerts a frictional force on the jacket surface of the pocket, which leads to a damping of the torsional vibrations of the driving disk acting on the driven train. The extent of damping depends upon the load and the number of revolutions.

During idling, no frictional force is required to damp the torsional vibrations. Low spring forces suffice for building up a reset moment from the driving disk to the driven disk and for decoupling the torsional vibrations. For this purpose, suitable means on the driving disk or on the thrust pistons, for example tangential or radial springs acting on associated surfaces of the driving disk, is provided. It is possible to use the vibration-damping assembly of the present invention, in place of most of the elastic clutch friction disks currently used in motor vehicles.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 6 shows a design with tangential idle-run support, in cross sections according to lines VIa—VIa and VIb—VIb in FIG. 7; and FIG. 7 is an axial longitudinal sectional view according to line VII—VII in FIG. 6.

DETAILED DESCRIPTION OF THE PREFERRED EMBODIMENTS

Figure 1:
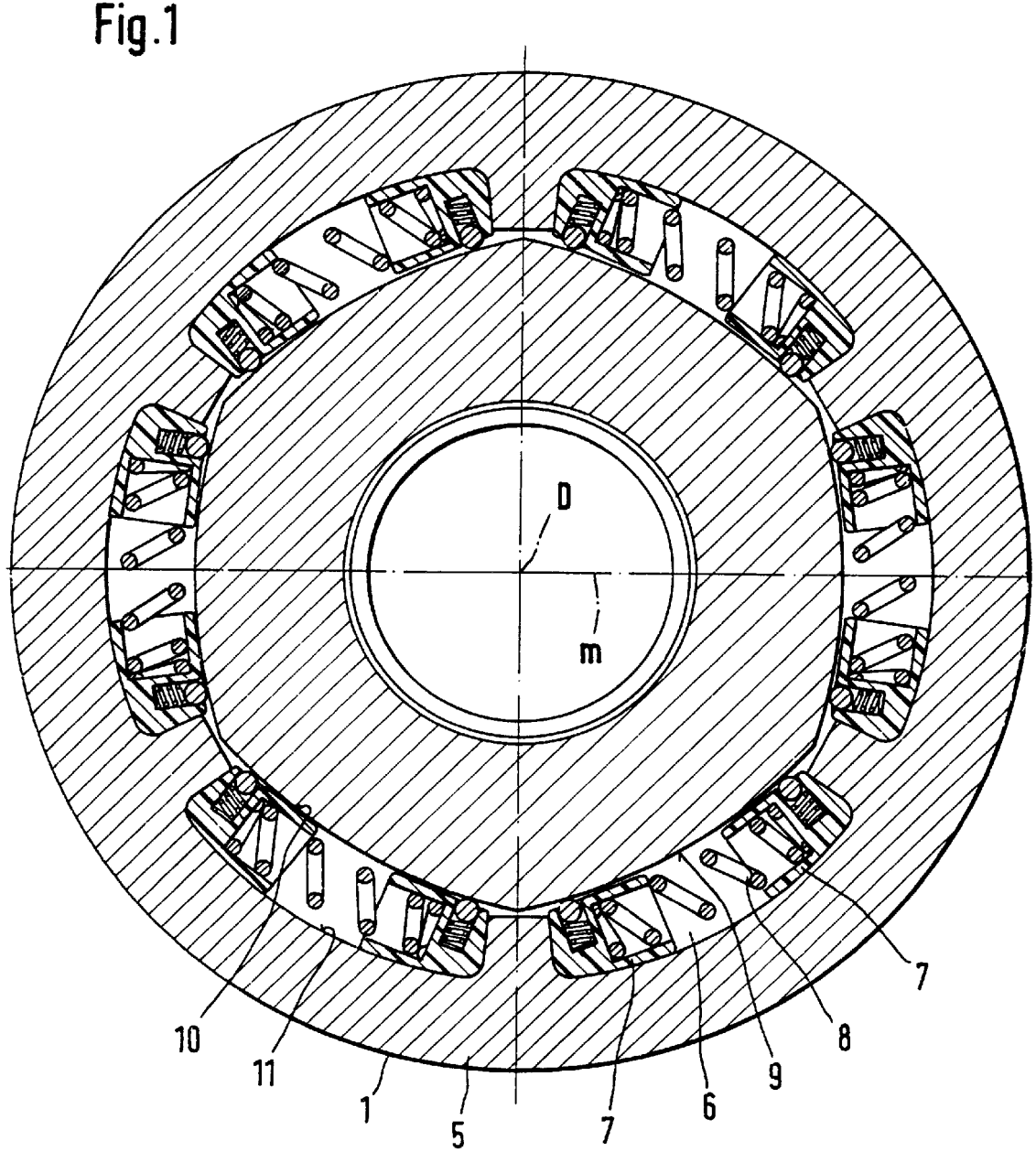
FIG. 1 is a cross-sectional view through a torsional vibration damping assembly according to the invention.

Referring now in detail to the drawings and, in particular, FIG. 1, torsional vibration damping assembly in the idle-run position is shown. The torsional vibration damping assembly consists of a driving disk 1 and a driven disk 2, which are coaxial with each other. The rear part of driven disk 2 is engaged by a driven train (not shown) with additional coupling elements of a shifting clutch or the like.

Figure 2:
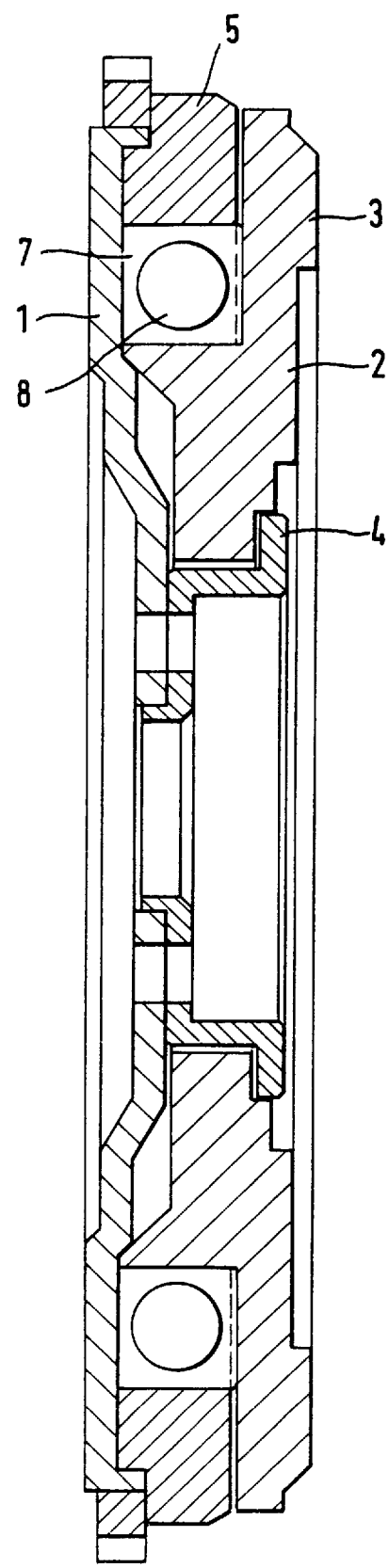
FIG. 2 is an axial cross-sectional view through the torsional vibration damping assembly.
Figure 3:
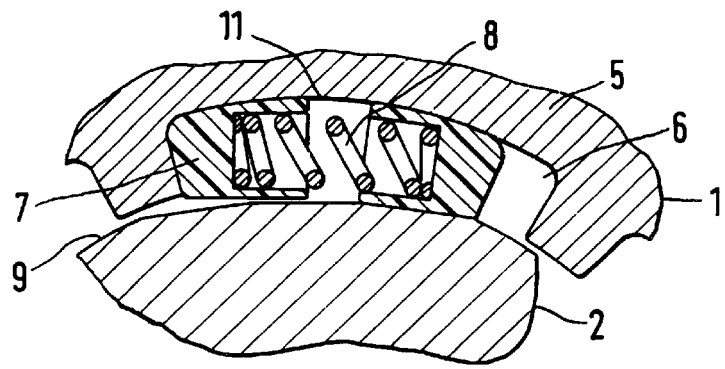
FIG. 3 is an enlarged detail of FIG. 1 under load.

As shown in FIG. 2, driven disk 2 is mounted on a centering hub 4, which has an axial Z-shaped profile and which is connected to driving disk 1.

As shown in FIG. 1, driving disk 1 has a ring-shaped part 5, which extends over a front part of driven disk 2. Ring shaped part 5 has radial pockets 6 distributed across the circumference of the inner side of part 5. Pockets 6 are tapered in a wedge-like way toward both ends.

A pair of thrust pistons 7 is arranged in each pocket 6, which are forced apart by at least one pressure spring 8. During idling, thrust pistons 7 rest against the ends of pockets 6.

Figure 5:
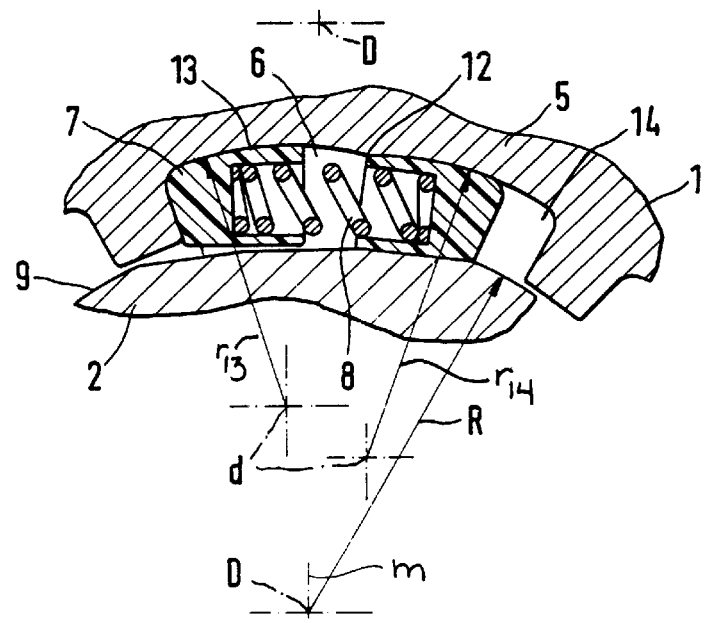
FIG. 5 shows another design of a pocket in the driving disk.

As shown in FIG. 5, jacket surface 9 of driven disk 2 has a polygonal cross section and a mean radius of curvature R. Cylinder 13 has a radius of $r_{13}$ and cylinder 14 has a radius of $r_{14}$. Correspondingly, side 10 of thrust pistons 7 facing driven disk 2 is planar or slightly curved.

Jacket surface 11 of each pocket 6 forms a part cylinder, the axis of curvature of which corresponds with the rotary axis D of the clutch, or which lies in radial center plane m through pocket 6, between pocket 6 and rotary axis D of the torsional vibration damping assembly.

Figure 4:
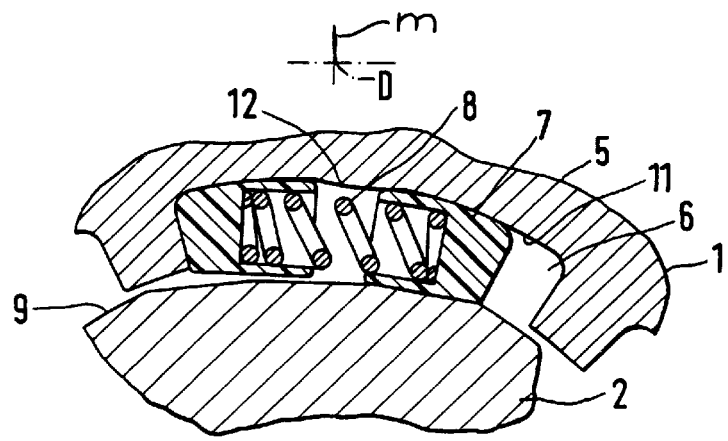
FIG. 4 shows the design of a pocket in the driving disk.

In order to avoid having thrust pistons 7 butt against one another to produce a particularly high frictional force at very high loads and thus high damping, a bead-like elevation 12 is provided in jacket surface 11, as shown in FIG. 4. Elevation 12 is arranged in at least some of pockets 6 within the zone of their radial center plane m, and forms a run-up threshold for thrust pistons 7.

Such an elevation can also be formed when jacket surface 11 of pocket 6 comprises two partial cylinders 13 and 14 intersecting each other, their axes d being disposed on both sides of the radial center plane m through pocket 6 and within the zone between rotary axis D of the clutch and pocket 6. Elevation 12 needs to be only a few tenths of a millimeter in height. The radii of curvature of partial cylinders 13 and 14 must be the same.

As shown in FIG. 1, thrust pistons 7 have radial bores 15, in which small pressure springs 16 are arranged. Springs 16, by means of transmission balls 17, apply pressure to jacket surface 9 of driven disk 2. During idle run, a reset moment is exerted by driving disk 1 to driven disk 2 with practically no frictional force.

Pressure springs 16 can also be arranged in bridges 19 of driving disk 1 between pockets 6.

Pressure springs 16 may also be arranged in the tangential direction in thrust pistons 7, or in driving disk 1, to act on the radial surfaces of driven disk 2 that are axially displaced relative to pockets 6.

Such an embodiment is shown in FIGS. 6 and 7. Tangential apertures 18 in the ends of thrust pistons 7 are provided with lightweight pressure springs 19 arranged in the apertures. In idle run, i.e., when thrust pistons 7 have assumed their final positions in pockets 6, the pressure springs act on axial pins 20, which are mounted in rearward part 3 of driven disk 2, forming a radial stop surface. In the presence of minor relative movements of driving disk 1 versus driven disk 2 due to idle-run torsional vibrations, only pressure springs 19 act, without any movement of thrust pistons 7.

When driving disk 1 is rotated and transmits a torque to the driven train, driving disk 1 moves relative to driven disk 2 and then moves one of the two thrust pistons 7 against the other thrust piston 7, the two pistons being present in a pocket 6. In this process, a frictional force is exerted on driving disk 1 and leads to damping of the torsional vibrations.

In idle run, when no torque is exerted on driven disk 2, the reset moment exerted by spring 16 or 19 achieves decoupling of the torsional vibrations. No frictional force is required for this.

For economic reasons, driving disk 1 is preferably made from a steel sheet and driven disk 2 of gray cast iron. The thrust pistons preferably are made of a heat-resistant plastic.

It is possible with the torsional vibration damping assembly according to the invention to save expensive mechanical or hydraulic torsional vibration dampers.

Accordingly, while only several embodiments of the present invention have been shown and described, it is obvious that many changes and modifications may be made thereunto without departing from the spirit and scope of the invention according to the appended claims.

What is claimed is:

1. A torsional vibration damping assembly having a rotary axis and means for elastic force transmission, comprising:

a rotating driving disk having an inside face and an overlapping ring-shaped portion;

a driven disk having a jacket surface with a polygonal cross-section, said driven disk arranged coaxially with the driving disk and rotating in the same direction as the driving disk, wherein the overlapping ring-shaped portion of the driving disk grips over a portion of the driven disk;

a plurality of radial pockets each having two ends, said pockets being disposed around the circumference of the inside face of the ring-shaped portion of the rotating driving disk, wherein said pockets are wedge-shaped at each end and wherein each pocket has a jacket surface;

a pair of wedge-shaped thrust pistons arranged in each of said radial pockets, wherein said pistons are slightly curved or planar on their sides facing the jacket surface of the driven disk;

at least one pressure spring arranged in each radial pocket, said pressure spring keeping said pistons apart from one another.

2. A torsional vibration damping assembly according to claim 1, wherein the jacket surface of each pocket forms a portion of a cylinder, said cylinder having an axis of curvature that corresponds to the rotary axis of the clutch.

3. A torsional vibration damping assembly according to claim 1, further comprising means for effecting a reset moment from the driving disk to the driven disk during idle run, while exerting a minimal frictional force.

4. A torsional vibration damping assembly according to claim 3, wherein the means for effecting a reset moment comprises a plurality of pressure springs that act on the driven disk, said pressure springs being arranged on the driving disk or in the thrust pistons.

5. A torsional vibration damping assembly according to claim 1, further comprising a bead-like elevation disposed on the jacket surface of at least one radial pocket, said bead-like elevation disposed in the radial center plane of said radial pocket, wherein said bead like elevation prevents the pistons from butting against one another at high loads.

6. A torsional vibration damping assembly according to claim 5, wherein the jacket surface of each pocket comprises two partial cylinders that intersect one another, the axes of each cylinder being arranged on opposite sides of the radial center plane of pocket between the rotary axis of the clutch and the pocket.

7. A torsional vibration damping assembly according to claim 1, wherein the driven disk is made of gray cast iron and the driving disk is made of a metal sheet part.

* * * * *